Patented Apr. 1, 1924.

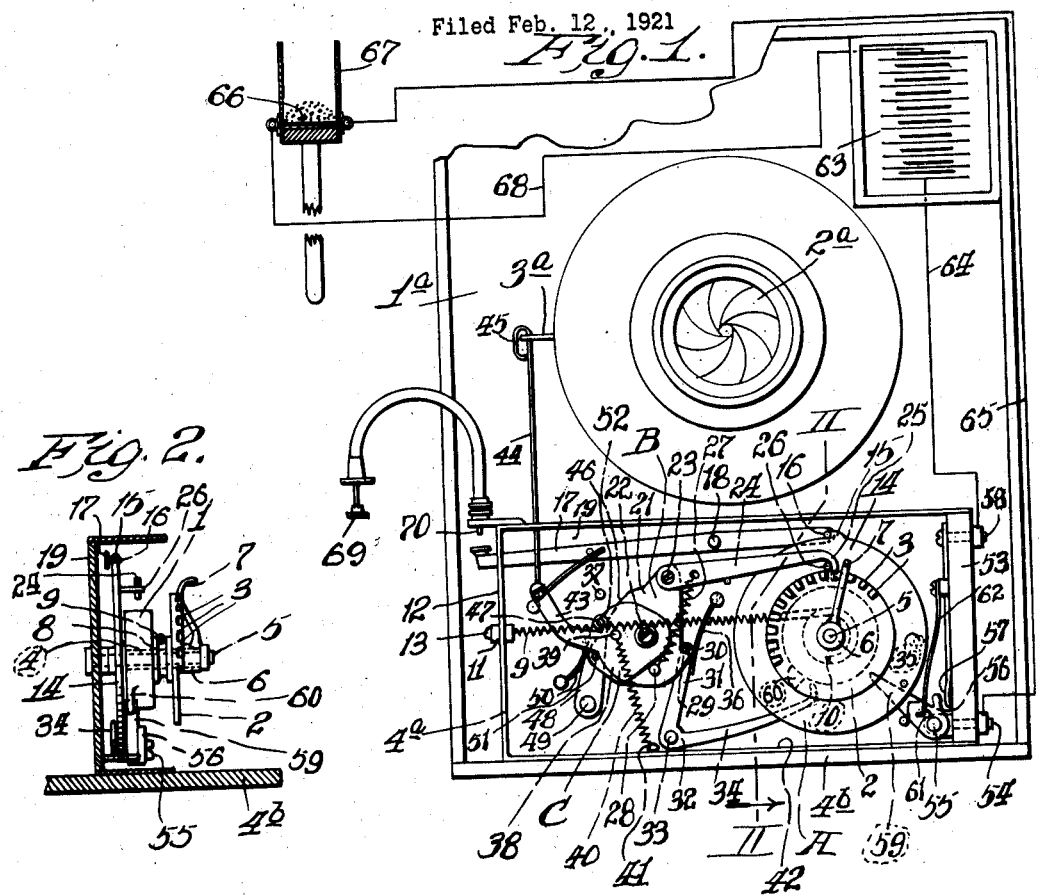

1,488,488

UNITED STATES PATENT OFFICE.

RUSSELL E. FROELICH, OF ST. LOUIS, MISSOURI, ASSIGNOR OF ONE-SIXTH TO MARION F. PARKER, OF WEBSTER, MISSOURI, AND ONE-SIXTH TO CLINTON K. MURPHY, JR., OF MAPLEWOOD, MISSOURI.

REGULATING DEVICE FOR TIMING CAMERA SHUTTERS RELATIVE TO FLASH LIGHTS.

Application filed February 12, 1921. Serial No. 444,326.

*To all whom it may concern:*

Be it known that I, RUSSELL E. FROELICH, a citizen of the United States of America, and a resident of the city of St. Louis and State of Missouri, have invented certain new and useful Improvements in a Regulating Device for Timing Camera Shutters Relative to Flash Lights, of which the following is a specification.

The primary object of this invention is to provide an improved regulating or timing mechanism that is operably related to the shutter of a camera so that the shutter can be actuated at the proper and exact time relative to the explosive flash of a flash lamp, so that an efficient exposure is given to the plate or film at the time that the explosive flash of the lamp is at its greatest efficiency.

Another object of this invention is to provide an improved timing mechanism relative to cameras that is operated in conjunction with flash lamps, so that the length of time required to actuate the camera shutter can be regulated relative to the length of time required to explode or burn a given quantity of flash powder.

Other and further objects will appear in the specification and be specifically pointed out in the appended claims, reference being had to the accompanying drawings exemplifying the invention, and in which, Figure 1 is a front elevation of a camera showing this improved regulating device mounted thereon, the cover portion of said device being removed for the purpose of disclosing the mechanism, said mechanism being set ready for operation.

Figure 2 is a transverse vertical section taken approximately on the line II—II of Fig. 1.

Figure 3 is a front elevation of the mechanism as disclosed in Figure 1 but showing the parts thereof in discharged or operated position, the housing of said mechanism being partly in section.

Referring to the drawings, 1ª designates a camera having the usual shutter 2ª and related thereto is the shutter operating lever 3ª, and secured to the base 4ᵇ of the camera is a housing 4ª for containing this improved regulating device, which is comprised of operating mechanisms A, B, and C. The mechanism A is further composed of a drum shaped member 1 bearing a setting plate 2 and formed on the front face of said plate is a series of spaced apart retaining blocks 3, said member 1 being turnably mounted on a sleeve 4 which is borne by a rigidly held shaft 5 and rigidly secured to said sleeve is a hub 6 of a setting arm 7, said setting arm adapted to adjustably engage between pairs of the blocks 3.

Formed on the member 1 is an annular groove 8 and seated within said groove is one end of a retractile coil spring 9, which is secured by the pin 10 within said groove, the opposite end of said spring being slidable within a sleeve 11, which is mounted in the end wall 12 of the housing 4ª, and there being a button 13 secured to said spring adjacent to said sleeve for preventing said spring from being withdrawn from said sleeve.

Rigidly secured to the sleeve 4 in opposite disposition from the hub 6 of the setting arm 7 is a resetting disc 14, said disc, setting arm 7, and drum 1 adapted to revolve as a unit on the shaft 5 on account of the setting arm 7 engaging between a pair of the blocks 3.

Extending from the peripheral edge of the disc 14 is an engaging portion 15, said portion 15 adapted to oppose the resilient pressure of the spring 9 by engagement with the catching portion 16, which is carried by one end of a releasing lever 17, said lever being pivoted intermediate of its ends at 18 to the rear wall 19 of the housing 4ª, the operating end of said lever extending through a slot 20 formed in the end wall 12 of said housing.

The mechanism B is further comprised of a cam 21 which is turnably mounted on a shaft 22 which extends horizontally from the rear wall 19, and pivoted to said cam at 23 is a resetting bar 24 having a hooked end 25 said hooked end adapted to be engaged by a pin 26, which is carried by the outer face of the disc 14, said resetting bar 24 having a spring 27 extending therefrom, said spring being secured at its opposite end at 28 to the cam 21. The cam 21 is provided with a catching portion 29, and when in the position as shown in Fig. 1, said catching portion is engaged by a retaining pin 30 which is borne by the upwardly extending end 31 of a bell-crank lever 32, said lever 32 being pivoted at 33 to the rear wall 19 of the housing 4ª, the other end 34 of said lever inclining horizontally and extending within the path of travel of the striking pin 35 which is carried by the rear face of the disc 14, and bearing against the extending end 31 of said lever 32 is a leaf spring 36, and for co-operation with said cam is a stop pin 37, which is extended from the rear wall 19 of the housing 4ª.

The mechanism C is further comprised of a tripping member 38, which is turnable on the shaft 22 adjacent the cam 21, and secured at 39 to said member is one end of a spring 40, said spring at its opposite end being secured at 41 to the lower wall 42 of the housing 4ª, and extending from said member is an arm 43, which is secured to the lower end of a pull rod 44, the looped end 45 of said rod being in engagement with the shutter operating lever 3ª. A catching portion 46 is formed on the tripping member 38, said catching portion when the mechanisms are set ready for operating being engaged by a retaining pin 47 which is carried by a lever 48, which is swingable at 49, to the rear wall 19 of the housing, said lever having a leaf spring 50 bearing thereagainst, and for holding said member 38 against the drawing pressure of the spring 40 a stop 51 is provided on the cam 21. The lever 48 is located rearwardly of the cam 21, the retaining pin 47 thereof being of a length so as to engage the catching portion 46 of the member 38 and incidentally said retaining pin 47 is arranged within the path of travel of a riding face 52 formed on the cam 21.

The wall 53 of the housing 4ª, which is arranged opposite to the end wall 12, is formed of insulating material and extending through said wall 53 adjacent its lower end is an electric terminal 54 and pivoted at 55 to the inner extending end of said terminal is a contacting member 56 which is co-operable with the resilient end 57 of a connector which is secured to an electric terminal 58 which is also passed through the insulated wall 53. Carried by the contacting member 56 is an insulated extending portion 59 said portion 59 extending rearwardly of the disc 14 and is arranged within the path of travel of an extending tripping portion 60 which is borne by the drum shaped member 1, and carried by said member 56 is a holding pin 61 which is borne against by a leaf spring 62, said leaf spring being secured to the insulated wall 53 of the housing 4ª, and is adapted to hold the contacting member 56 in both positions as shown in Figs. 1 and 3.

Secured to the camera 1ª in any convenient place or manner is a battery 63 and leading to said battery from the terminal 58 is a wire 64 and in circuit with the terminal 54 is a wire 65 which leads to the fuse 66 of a flash lamp 67, and leading from said fuse to said battery 63 is a return wire 68.

As already set forth in the objects of this invention the theme thereof is to provide a regulating device to be used in conjunction with a camera and a relatable flash lamp, the purpose thereof being to provide a scientific regulation of the time of operation of the flash lamp and camera relative to one another so that the camera will be subject to operate at the precise and required time, which required time of exposure is taken when the maximum of light is given off from the flash lamp. In the present day mode of operation of a camera and a relatable flash lamp, the time of actuation of the camera shutter is taken and given in a haphazard way, and the results acquired are more or less unfavorable on account of the fact that the camera shutter is operated either too soon or too late relative to the exploding of the powder contained in the flash lamp in which the exposure was not given the maximum amount of light which may have been had or should have been given. This invention, therefore, is to provide means for predetermining and setting mechanisms whereby a positive and correct exposure can be made under any prevailing conditions or circumstances.

In the operation of this improved device, a proper amount of flash powder is placed within the lamp 67, which may be held by the operator or predeterminedly set into position and in circuit with battery 63 and electric terminals 54 and 58 as well as the mechanisms A, B, and C being set in the positions shown in Fig. 1, then the operator engages and presses a button 69 of the push wire 70, the extending end of said wire engaging and pushing downwardly on the extending end of the lever 17 thereby elevating and disengaging the catching portion 16 from the engaging portion 15 of the disc 14, and in which the spring 9 will immediately become active and rotate the member 1 in a left hand direction, and inasmuch as the extending portion 59 of the contacting member 56 is located in the path of travel of the portion 60 carried by the revolving member 1 said portion 59 will be tripped by said portion 60 and moved to the position shown in Fig. 3, thereby contacting said member 56 with the resilient end 57 of the connector of the terminal 58 and closing the circuit of the battery 63 in which the lamp 67 is contained and causing the fuse 66 of said lamp to burn and ignite the powder of the lamp.

After the contact member 56 has been tripped the further revolving of the disc 14 brought the striking pin 35 which is carried by said disc into contact with the end 34 of the bell crank lever 32, thereby forcing said end 34 downwardly and withdrawing the retaining pin 30 carried by said lever from engagement with the catching portion 29 of the cam 21 and allowing the spring 27 to become active on said cam and turn said cam in a left hand direction so that the riding face 52 of said cam will bear against and disengage the retaining pin 47 from engagement with the catching portion 46 of the tripping member 38 and allowing the spring 40 of said member 38 to become active on said member and pull the arm 43 thereof downwardly as well as the pull rod 44, which is connected to the shutter operating lever 3ª, thereby operating the shutter 2ª of the camera, the parts of the device after being operated being in the positions shown in Fig. 3.

During the aforesaid operation of the parts just described, it is to be noted that the mechanism B was not operated until after electrical contact of the flash-lighting circuit had been made by actuation of the mechanism A, and that the mechanism C for actuating the shutter operating lever 3ª was not actuated until after the mechanism B was actuated, such timing of the different mechanisms relative to one another providing for a proper intervening space of time for the quantity of powder in the flash lamp 67 to be ignited and burned, thereby giving off a maximum amount of light just at the time when the shutter operating lever 3ª is operated.

Under certain circumstances if it is desired, that a greater intervening space of time is required between the closing of the flash light circuit and the operating of the shutter lever, the setting arm 7 is sprung from between a pair of the retaining blocks 3 of the setting plate 2 so that said plate and the parts related thereto comprising the drum shaped member 1, can be turned in a left hand direction on the sleeve 4, thereby locating the tripping portion 60 in a position nearer to the extending portion 59 of the contacting member 56, and in such a position said portion 60, when the device is set ready for operation, will be nearer to the portion 59, so that when the disc 14 or mechanism A is released said portion 60 will trip the portion 59 and create a flash light contact at a period earlier in which a greater time will be given between the making of the flash light circuit and the operating of the shutter lever 3ª.

If it is desired to shorten the intervening space of time between the operating of the mechanisms A and C, then the tripping portion 60 is moved in a right hand direction towards the striking pin 35 so that said portion 60 upon tripping the portion 59 of the contact member 56 will immediately be followed by the striking pin 35 tripping the bell crank lever 32 of the mechanism B so that the mechanism B will immediately act on the mechanism C, thereby operating the flash light circuit and the shutter lever 3ª nearer together.

From the aforesaid it is to be noted that by operating the setting plate 2 a scientific adjustment can be given between the operating of the contacting member of the flash light circuit and the mechanisms for tripping the camera shutter lever, relative to predetermining the length of time required for the burning of different quantities of flash light powders, so that a desired maximum amount of light can be obtained under any existing conditions.

For resetting the device after it has been operated the setting arm 7 is engaged and turned in a right-hand direction, thereby bringing the engaging portion 15 of the disc 14 into engagement with catching portion 16 of the releasing lever 17. This right-hand turning movement of the disc 14 also carried the pin 26 to a position of engagement with the hooked end 25 of the resetting bar 24 and as said disc was further turned, the cam 21, to which the bar 24 is secured, was also brought to its former position, in which the pin 30 of the extending end 31 of the bell crank lever 32 will engage with and retain the catching portion 29 of said cam 21. On account of the stop 51 being borne by the cam 21, said cam when being returned to its former position also causes the tripping member 38 to be returned as said stop 51 engages against the underside of the arm 43 of said member 38 and as the arm 43 was moved upwardly the pull rod 44 engaged thereto was also moved upwardly, thereby returning the shutter operating lever 3ª to the position ready for the next operation of the camera shutter.

In connection with the adjustment of the setting arm 7 relative to the setting plate 2 for providing a lapse of a greater or lesser intervening space of time between the closing of the flash light circuit and the operating of the shutter lever, it is to be noted the actuating spring 9 of the member 1 is placed under either a greater or lesser tension, all depending on the position of the setting plate 2 of said member 1 in which the spring 9 will be engaged into the groove 8 a greater distance when the tripping portion 60 is set a greater distance away from the portion 59 of the contacting member 56 thereby providing a greater tension to said spring, whereas if the portion 60 is adjusted nearer to the portion 59 the spring 9 will not be engaged as far within the groove 8 thereby providing said spring with a lesser tension.

What I claim is:

1. A device for predetermining the time of actuation of a camera shutter relative to the explosion of a flash lamp, comprising a movable member bearing an adjustable setting member, a camera shutter lever, a releasing mechanism co-operable with said movable member and said shutter lever, and a movable contacting member to be moved by said setting member.

2. A device for predetermining the time of actuation of a camera shutter relative to the explosion of a flash lamp, comprising a movable member bearing an adjustable setting member, a camera shutter lever, a releasing mechanism co-operable with said movable member and said shutter lever, a contacting member to be moved by said setting member, and resetting means for said mechanism co-operable with said movable member.

3. A device for predetermining the time of actuation of a camera shutter relative to the explosion of a flash lamp, comprising a movable member bearing an adjustable setting member, a movable contacting member to be operated by said setting member, a camera shutter lever, a releasing mechanism co-operable with said movable member and said shutter lever, means for holding said movable member against movement, and a flash lamp having electrical connection with said contacting member.

4. A device for predetermining the time of actuation of a camera shutter relative to the explosion of a flash lamp, comprising a movable member, a setting member related to said movable member, a movable contacting member under the control of said setting member to be operated thereby, a camera shutter lever, a releasing mechanism co-operable with said movable member and said shutter lever, means for holding said movable member against movement, other means for releasing said holding means, and a flash lamp having electrical connection with said contacting member.

5. A device for predetermining the time of actuation of a camera shutter relative to the explosion of a flash lamp, comprising a movable member, an adjustable setting member related to said movable member, a camera shutter lever, a releasing mechanism co-operable with said movable member and said shutter lever, and a movable contacting member to be actuated by said setting member.

6. A device for predetermining the time of actuation of a camera shutter relative to the explosion of a flash lamp, comprising a movable member, an adjustable setting member related to said movable member, a camera shutter lever, a releasing mechanism co-operable with said movable member and said shutter lever, a movable contacting member to be actuated by said setting member, resetting means for said movable member, and a flash light emitting element in circuit with said contacting member.

7. A device for predetermining the time of actuation of a camera shutter relative to the explosion of a flash lamp, comprising a movable member, an adjustable setting member related to said movable member, a camera shutter lever, a releasing mechanism co-operable with said movable member and said shutter lever, a contacting member to be moved by said setting member, resetting means for said mechanism co-operable with said movable member, and a flash light emitting element in circuit with said contacting member.

8. A device for predetermining the time of actuation of a camera shutter relative to the explosion of a flash lamp, comprising a movable member, a setting member related to said movable member, a movable contacting member under the control of said setting member to be actuated thereby, a camera shutter lever, a releasing mechanism co-operable with said movable member and said shutter lever, means for holding said movable member against movement, other means for releasing said holding means, resetting means co-operable with said movable member and said mechanism, and a flash lamp having electrical connection with said contacting member.

9. A device for predetermining the time of actuation of a camera shutter relative to the explosion of a flash lamp, comprising a movable member, an adjustable setting member related to said movable member, a camera shutter lever, a releasing mechanism co-operable with said movable member and said shutter lever, and a spring held swingable contacting member to be actuated by said setting member.

10. A device for predetermining the time of actuation of a camera shutter relative to the explosion of a flash lamp, comprising a revoluble member, an adjustable setting member carried by said revoluble member, an electric contacting member to be engaged and actuated by said setting member, an electric circuit in which said contacting member is located, a flash lamp located in said circuit, and releasing means for allowing said revoluble member to rotate.

11. A device for predetermining the time of actuation of a camera shutter relative to the explosion of a flash lamp, comprising a revoluble member, an adjustable setting member carried by said revoluble member, a camera shutter lever, a releasing mechanism co-operable with said revoluble member and said lever, an electric contacting member to be engaged and swung by said setting member, an electric circuit in which said contacting member is located, a flash lamp located in said circuit, and resilient means for rotating said revoluble member.

12. A device for predetermining the time of actuation of a camera shutter relative to the explosion of a flash lamp, comprising a movable member bearing an adjustable setting member, a coil spring secured at one end to said movable member for actuating said movable member, a camera shutter lever, a releasing mechanism co-operable with said movable member and said shutter lever, and a movable contacting member to be actuated by said setting member.

13. A device for predetermining the time of actuation of a camera shutter relative to the explosion of a flash lamp, comprising a revoluble member, a coil spring to be engaged around a portion of said member, an adjustable setting member carried by said revoluble member, an electric contacting member to be engaged and actuated by said setting member, an electric circuit in which said contacting member is located, a flash lamp located in said circuit, and releasing means for allowing said revoluble member to be rotated by said spring.

RUSSELL E. FROELICH.